United States Patent [19]

Sasaki

[11] Patent Number: 4,767,958
[45] Date of Patent: Aug. 30, 1988

[54] STEPPING MOTOR ACTUATOR WITH TWO INTERPOSED POLE TOOTH PAIRS

[75] Inventor: Hidemi Sasaki, Tokyo, Japan

[73] Assignee: Fuji Photo Film Co., Ltd., Kanagawa, Japan

[21] Appl. No.: 63,942

[22] Filed: Jun. 19, 1987

[51] Int. Cl.[4] .............................................. H02K 7/10
[52] U.S. Cl. .................................. 310/257; 192/143; 310/49 R; 310/80
[58] Field of Search ................. 310/89, 112, 114, 156, 310/257, 263, 80, 83, 49 R; 74/89.15, 424.8 R; 192/141, 143

[56] References Cited

U.S. PATENT DOCUMENTS

| 1,577,206 | 3/1926 | Dempster | 192/143 X |
| 3,234,418 | 2/1966 | Tomaro, Jr. | 310/164 |
| 3,249,191 | 5/1966 | Helms | 192/143 |
| 4,009,406 | 2/1977 | Inariba | 310/112 |
| 4,318,018 | 3/1982 | Kennedy | 310/257 |
| 4,535,263 | 8/1985 | Avery | 310/112 |
| 4,588,913 | 5/1986 | Adami | 310/49 R |

Primary Examiner—Patrick R. Salce
Assistant Examiner—D. L. Rebsch
Attorney, Agent, or Firm—Sughrue, Mion, Zinn, Macpeak, and Seas

[57] ABSTRACT

A stepping motor suitable as a drive source for driving a head carriage in a magnetic recording/reproducing apparatus for use in an electronic still camera or the like. In the stepping motor, a magnet rotor is formed in the outer circumferential surface with alternately arranged north and south poles, while two excitation coils, which serve as the stator part of the stepping motor, are located such that they embrace the magnet rotor from both axial ends thereof. The two excitation coils are embraced by two yokes, respectively. Each of the yokes is provided with pole teeth, formed so as to cover the circumference of the magnet rotor. A slidable screw parallel to the shaft serves as a linear actuator.

3 Claims, 6 Drawing Sheets

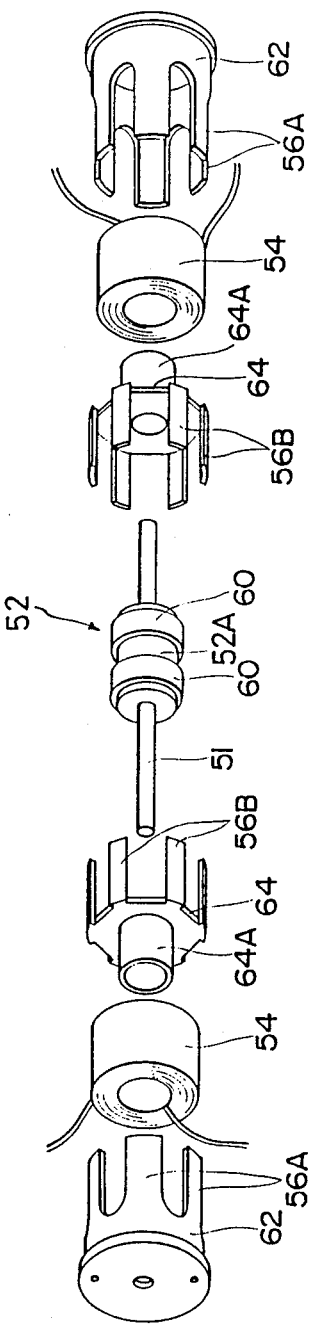

STEPPING MOTOR ACTUATOR WITH TWO INTERPOSED POLE TOOTH PAIRS

BACKGROUND OF THE INVENTION

1. Field of the Invention

The present invention relates to a stepping motor for use in a rotary magnetic disc device and, in particular, to a stepping motor for a rotary magnetic disc device used as a magnetic recording/reproducing device in an electronic still camera or the like.

2. Description of the Prior Art

Recently, there has been developed an attractive electronic still camera system in which an image pickup device such as a solid image pickup element, an image pickup tube or the like is combined with a recording device employing as a recording medium thereof an expensive magnetic disc having a relatively larger storage capacity, such that an object can be still-photographed electronically and recorded into a rotating magnetic disc and the reproduction of the recorded image can be performed by means of a television system, a printer or the like which is provided separately from the electronic still camera system.

The magnetic disc that is used in such camera system is usually in the form of a magnetic disc pack. In the magnetic disc pack there is rotatably stored a magnetic disc which is capable of magnetic recording of still image information or the like, and such magnetic disc pack is used after it is mounted as a rotary magnetic disc device incorporated in an electronic camera.

There is generally well known a head carriage driver mechanism in the rotary magnetic disc device which is used to transmit a rotational force from a stepping motor to a head carriage through a gear reduction mechanism, a lead screw and the like, as a linear movement. In this drive system, a given number of pulses are applied from a control part to the stepping motor, so that a track-by-track feed can be performed.

By the way, in such a case as in the electronic still camera or the like where space is limited, it is necessary that all essential parts be compactly assembled within the rotary magnetic disc device.

However, a conventional stepping motor used in the rotatry magnetic disc device, as shown in FIG. 7, is composed of a solenoid coil 70, a yoke 72 enclosing the solenoid coil 70, a rotor magnet 74 which is loosely inserted into the coil 70, and a plurality of teeth 76 formed integrally with the yoke 72 and interposed between the coil 70 and the rotor magnet 74. In such structure, because the solenoid coil 70 is positioned in the outer periphery of the rotor magnet, the diameter of the coil 70 is large so that the stepping motor is also larger in size. Such large-size stepping motor provides an obstacle in assembling the electronic still camera and the like in a compact manner.

SUMMARY OF THE INVENTION

The present invention aims at eliminating the drawbacks found in the above-mentioned prior art stepping motor.

Accordingly, it is an object of the invention to provide an improved stepping motor which can be incorporated into a device having a limited space such as an electronic still camera and the like.

In order to accomplish this object, according to the present invention, there is provided a stepping motor which comprises a magnet rotor fixed to the periphery of a rotary shaft and having north and south poles formed alternately in the outer peripheral surfaces thereof, first and second excitation coils arranged such that the rotary shaft is inserted therethrough and also that the magnet rotor can be embraced from both sides thereof by the excitation coils, and first and second yokes respectively having pole teeth corresponding to the number of poles of the magnet rotor and embracing the first and second excitation coils, with the pole teeth covering the periphery of the magnet rotor.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 6 is an exploded, perspective view of a stepping motor according to the invention; and, FIG. 7 is a perspective view of a stepping motor according to the prior art.

DETAILED DESCRIPTION OF THE INVENTION

Detailed description will hereunder be given of the preferred embodiment of a stepping motor according to the present invention with reference to the accompanying drawings.

Figure 1:
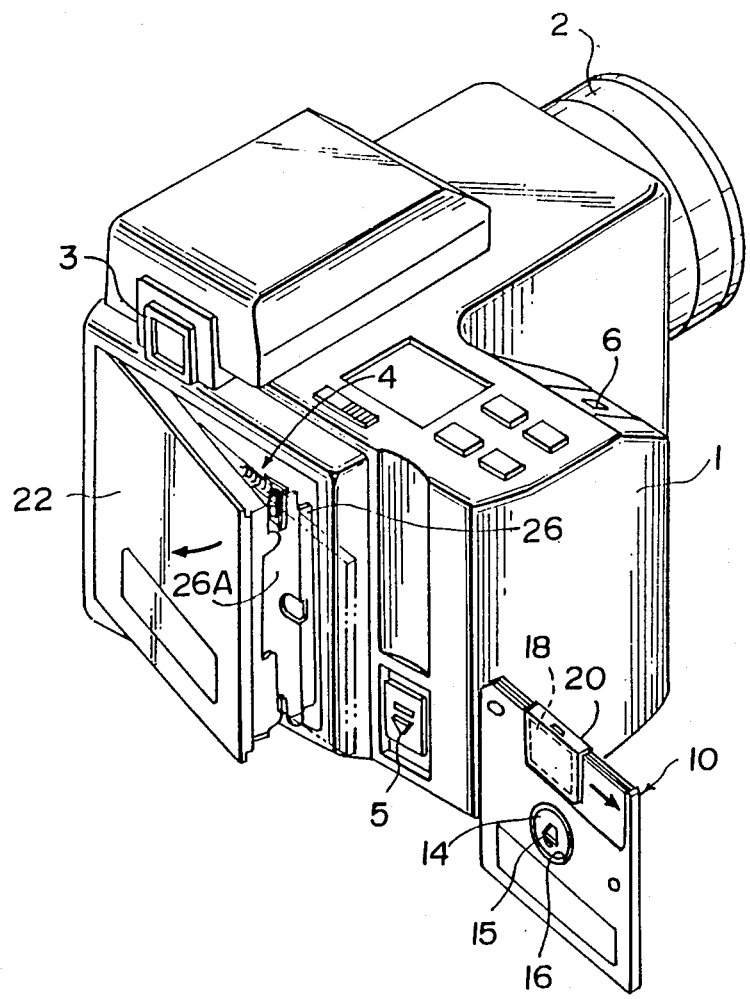
FIG. 1 is a perspective view of an electronic still camera.

In FIG. 1, there is illustrated a general structure of an electronic still camera to which a stepping motor according to the invention is applied. In this figure, reference numeral 1 designates a camera body, 2 a lens mount, 3 a finder, 4 a rotary magnetic disc device, 5 a knob for opening/closing a holder of the rotary magnetic disc device, and 6 a shutter release button, respectively.

The rotary magnetic disc device 4 of an electronic still camera is provided with a back cover 22 which can be rotated and opened in the direction of an arrow shown in FIG. 1. To the inside of the back cover 22 there is mounted a holder 26 of the rotary magnetic disc device and the holder 26 is provided with an insertion opening 26A which can be exposed externally when the back cover 22 is opened. A magnetic disc pack 10 can be inserted through the insertion opening 26A and stored in the holder 26, and also the pack 10 can be mounted to a drive shaft 32 shown in FIG. 2 when the cover 22 is closed.

As shown in FIG. 1, the magnetic disk pack 10 is shaped in a substantially square form and within the pack 10 there is rotatably stored a magnetic disc into which still image information or the like can be recorded. The magnetic disc includes a center core 14 in the center portion thereof as a reinforcing member, and the center core 14 is exposed externally through a circular opening 16 of the magnetic disc pack 10. The center core 14 is formed with a center bore 15 in which there is formed a resilient piece member which is not shown. Thanks to this, the drive shaft 32 can be fitted into the center bore 15 of the center core 14 against the energizing force of the resilient piece member. The magnetic disc pack 10 is formed with a window 18 in which a magnetic head to be described later can be situated and the window 18 for the magnetic head can be opened/closed by a slidable shutter 20. That is, the shutter 20 closes the window 18 to protect the magnetic disc from dust before the magnetic disc pack 10 is inserted into the holder 26, and, when the pack 10 is inserted into the holder 26, the shutter 20 is moved in the right direction in FIG. 1 to open the magnetic head window 18, thereby enabling recording into, and reproducing from the magnetic disc 12.

Figure 2:
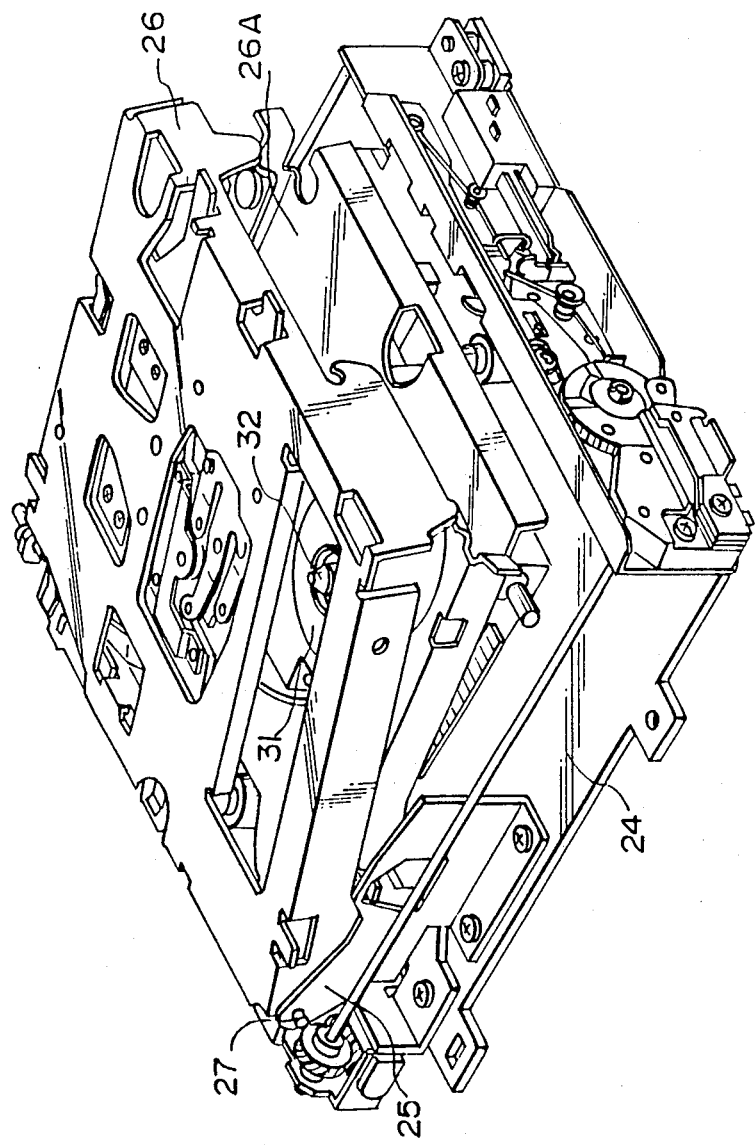
FIG. 2 is a perspective view of a rotary magnetic disc device used for an electronic still camera.

In FIG. 2, there is shown a drive mechanism employed in the rotary magnetic disc device 4. The rotary magnetic disc device 4 includes a chassis 24 which is provided with a bracket 25 in the inner-most end portion thereof. The holder 26 is pivotally supported by the bracket 25 through a pivot shaft 27. In the chassis 24 there is arranged a motor 31 which is used to drive the magnetic disc. The motor 31 has a drive shaft 32 which can be fitted into the center bore 15 of the center core 14 of the magnetic disc pack 10 shown in FIG. 1 to rotate the magnetic disc within the magnetic disc pack 10 at a given number of rotations.

Figure 3:
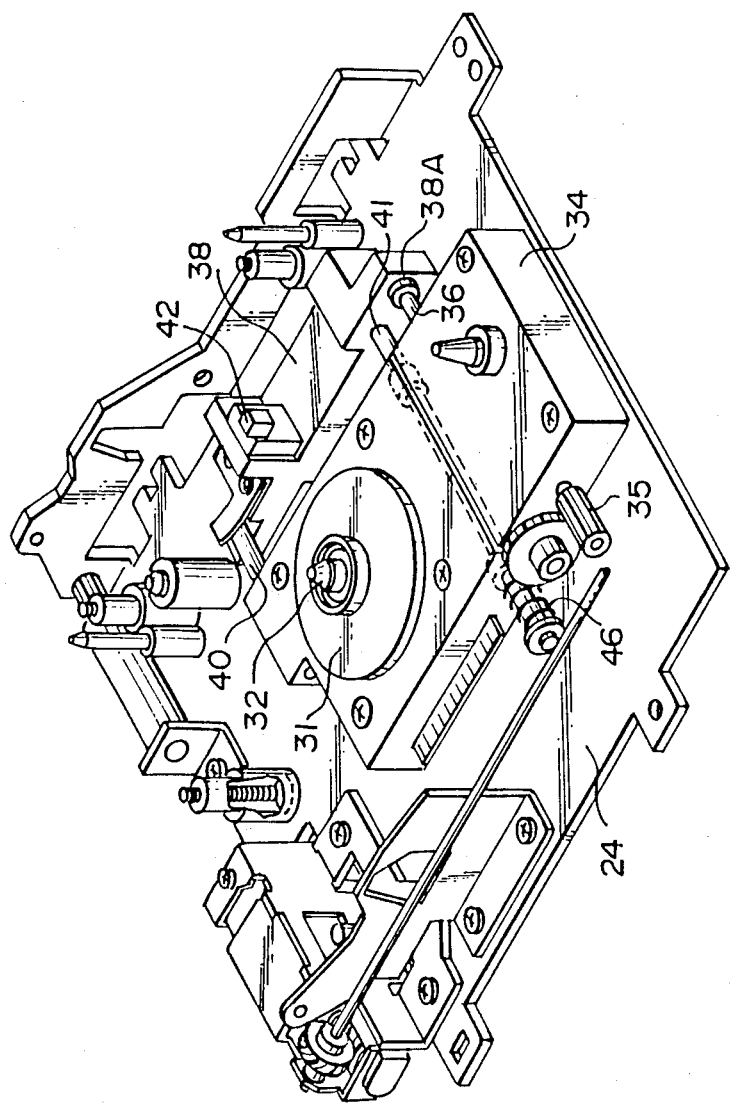
FIG. 3 is a perspective view of a drive mechanism employed in the main body of the rotary magnetic disc device.

In FIG. 3, there is shown the internal structure of the magnetic disc device 4 with the holder 26 being removed. In this figure, reference numeral 34 designates a block for feeding the magnetic head, and 36 represents a lead scrw which is connected via transmission means 35 to the output shaft of a stepping motor 50 to be described later. 38 denotes a head carriage to be guided by two guide shafts 40, 41 which are araged in parallel to each other, and 42 stands for a magnetic head provided on the head carriage 38.

Figure 4:
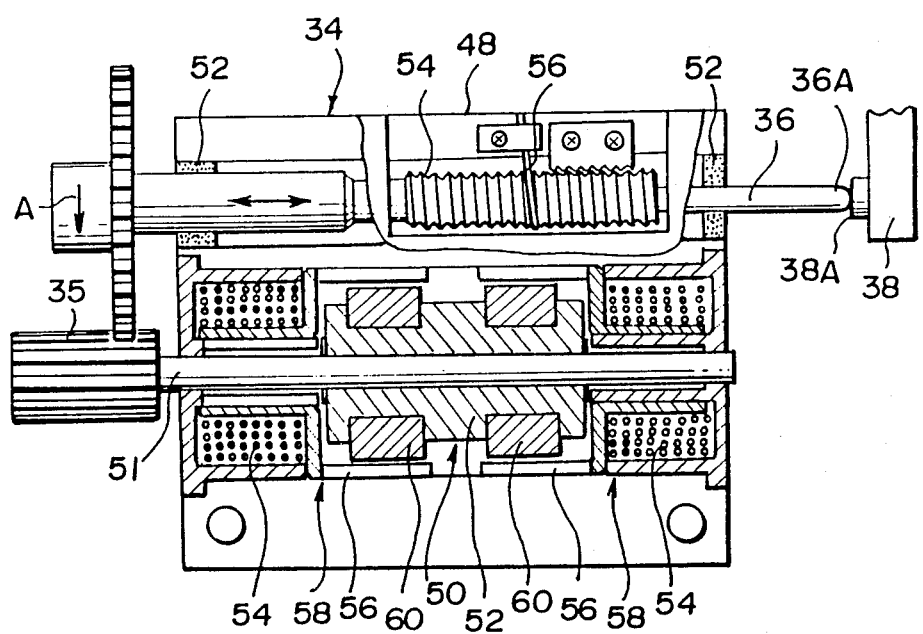
FIG. 4 is a section view of a head feeding block in which a stepping motor according to the invention is stored.

As shown in FIG. 4, the lead screw 36 is stored within a casing 48 of the head feeding block 34, together with the feeding stepping motor 50 mentioned above. The lead screw 36 is supported by two bearings 52, 52 respectively arranged within the casing 48 and it is also formed with a threaded portion 54. The threaded portion 54 can be engaged with a resilient wire member 56 serving as an engagement member in such a manner that the resilient wire member 56 is wound onto the root portions of the threaded portion 54, and the two ends of the resilient wire member 56 are respectively fixed to the casing 48. When the lead screw 36 is rotated via the transmission gear 35 by the feeding stepping motor 50, then the lead screw 36 is moved in the direction of arrows shown (that is, in the right and left direction in FIG. 4) thanks to the engagement with the resilient wire member 56. When the lead screw 36 is rotated in the direction of an arrow A in FIG. 4, then the right end 36A of the lead screw 36 can push and advance the receive portion 38A of the head carriage 38. By the way, as shown in FIG. 3, in the guide shaft 41 there is mounted a compression spring 46 which is biasing the head carriage 38 in the left direction with a constant biasing force.

Thus, if the stepping motor 50 is rotated at every given number of rotations, then, due to the movement of the lead screw 36, the head carriage 38 is moved in the axial direction of the guide shafts 40, 41 at every given pitch, which moves the magnetic head 42 in the radial direction of the magnetic disc so that still image information can be recorded into or reproduced from the magnetic disc track by track.

Figure 5:
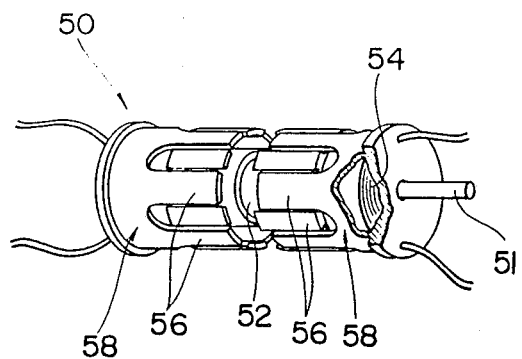
FIG. 5 is a perspective view of a stepping motor according to the invention.
Figure 7:
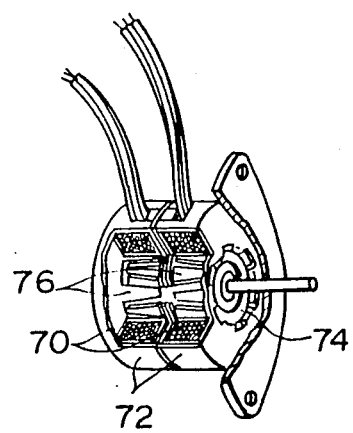

As shown in FIGS. 4 and 5, the head feeding stepping motor 50 which comprises a magnet rotor 52 which is provided on a rotary shaft 51 of the stepping motor, a pair of excitation coils 54, 54 respectively disposed on either side of the magnet rotor 52, and yokes 58, 58 respectively enclosing the coils 54, 54 and formed with pole teeth 56. Namely, the stepping motor 50 is formed in a cylindrical shape.

Referring now to FIG. 6, there is illustrated an exploded, perspective view of the above-mentioned stepping motor 50. The magnet rotor 52 includes a core member 52A which is fixed to the circumference of the stepping motor shaft 51 and the magnet rotor 52 also comprises two annular magnets 60, 60 respectively mounted onto the circumference of the core member 52A. The annular magnet 60 is provided in the external peripheral surface thereof with alternately arranged N (north) and S (south) poles (not shown). Specifically, there are provided a total of 6 N poles and a total of 6 S poles.

The above-mentioned pair of coils 54, 54 are respectively disposed in the axial direction and in either side of the magnet rotor 52 and are loosely fitted over the stepping motor shaft 51 from either end thereof. Also, each of the yokes 58 respectively embracing the coils 54 is composed of an outer yoke member 62 and an inner yoke member 64. The outer yoke member 62 is fitted over the associated coil 54 and the inner yoke member 64 is mounted such that the tubular portion 64A of the inner yoke member 64 is fitted into the coil 54. The outer yoke member 62 and the inner yoke member 64 are respectively provided with 6 pole teeth 56 which are formed so as to face toward the magnet rotor 52, so that the pole teeth are projected in a manner to cover the outer peripheral surface of the annular magnet 60 mounted onto the magnet rotor 52. Also, the pole teeth 56A—in the outer yoke member 62 are respectively interposed among the pole teeth 56B in the inner yoke member 64, so that the pole teeth 56A and 56B are projected alternately along the periphery of the magnet rotor 52.

For this reason, the pole teeth 56A formed in the outer yoke member 62 have a different magnetic pole from that of the pole teeth 56B formed in the inner yoke member 64. And, the pole teeth 56A and 56B formed in the yoke 58 are disposed around the magnet 60 such that they are opposed alternately. Also, the above-mentioned annular magnets 60, 60 or the pole teeth 56, 56 of the yokes 58, 58 are arranged such that they are out of phase (for example, 90° out of phase) from each other.

Next, description will be given below of the operation of the embodiment of the rotary magnetic disc device constructed in the abovementioned manner according to the present invention.

At first, if the magnetic disc pack is inserted into the holder 26 shown in FIG. 1 and the holder 26 is closed, then the magnetic disc is rotated by the drive shaft 32. Also, the rotational force from the stepping motor 50 is transmitted via the gear transmission means 35 to the lead screw 36 and, as a result of this, the lead screw 36 is moved in the right direction in FIG. 4. The head carriage 38 is normally energized in the left direction by the compression spring 46 but, however, as the lead screw 36 is moved in the right direction, the head carriage 38 is also moved in the right direction in FIG. 4 against the energizing force of the compression spring 46. As a result of this, the magnetic head 42 is moved in the radial direction of the magnetic disc so as to be able to magnetically record still image information into the tracks of the magnetic disc or reproduce the recorded still image information from the tracks in a track-by-track manner.

In this case, due to the fact that the stepping motor 50 is constructed such that it has a small diameter, the stepping motor 50 can be compactly stored within the casing 48 of the block 34 together with and in parallel to the lead screw 36. In other words, since there is eliminated the use of a large-diameter coil motor as in a conventional stepping motor, the stepping motor according to the invention can be easily arranged in a small space when it is incorporated into the rotary magnetic disc device 4 and also the present stepping motor provides no obstacle to other members to be mounted.

As has been described hereinbefore, according to the invention, there is provided a stepping motor which can be constructed by arranging excitation coils on both sides of a magnet rotor in the axial direction of the rotor and, therefore, the stepping motor can be reduced in diameter when compared with a conventional stepping motor in which coils are arranged externally of a magnet rotor.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A motor unit for converting a rotational movement into a linear movement, comprising:
   a rotary shaft disposed in a block forming said motor unit;
   a magnet rotor comprising a core member fixed substantially to a central portion of said rotary shaft, first and second annular magnets disposed in parallel with each other on the circumferences of said core member, each of said annular magnets being provided with alternately arranged north or south poles on the outer peripheral surface thereof;
   first and second excitation coils respectively wound in a cylindrical manner and disposed adjacent to said first and second annular magnets, said rotating shaft having end journal portions extending through central portions of said first and second excitation coils, respectively;
   a first yoke comprising inner and outer yoke members each having a number of pole teeth corresponding to the number of said north or south poles of said annular magnet and fixed within said block such that said first yoke inner and outer yoke members surround said first excitation coil, said pole teeth of said first yoke inner and outer yoke members alternating circumferentially and extending out in the direction of said first annular magnet to surround the outer periphery of said first annular magnet;
   a second yoke comprising inner and outer yoke members each having a number of pole teeth corresponding to the number of said north or south poles of said annular magnet and fixed within said block such that said second yoke inner and outer yoke members surround said second excitation coil, said pole teeth of said second yoke inner and outer yoke members alternating circumferentially and extending out in the direction of said second annular magnet to surround the outer periphery of said second annular magnet;
   a lead screw located in parallel with said rotary shaft, having a threaded portion in a central portion thereof, and disposed within said block such that it is free to slide in the axial direction thereof;
   a member fixed within said block and engageable with said threaded portion of said lead screw; and
   power transmission means for transmitting the rotational movements of said rotary shaft to said lead screw.

2. A stepping motor as set forth in claim 1, wherein the poles of said first and second annular magnets are arranged out of phase to one another.

3. A stepping motor as set forth in claim 1, wherein the pole teeth of said first and second yokes are arranged out of phase to one another.

* * * * *

UNITED STATES PATENT AND TRADEMARK OFFICE
CERTIFICATE OF CORRECTION

PATENT NO. : 4,767,958

DATED : August 30, 1988

INVENTOR(S) : Hidemi SASAKI

It is certified that error appears in the above-identified patent and that said Letters Patent is hereby corrected as shown below:

The following information has been added to the heading:

Foreign Application Priority Data

June 20, 1986 (JP)  Japan  61-094377

Signed and Sealed this

Fifth Day of September, 1989

Attest:

DONALD J. QUIGG

Attesting Officer  Commissioner of Patents and Trademarks